United States Patent

[11] 3,573,873

[72] Inventor Henry A. Pearson
 125 Cedarbrook Road, Ardmore, Pa. 19003
[21] Appl. No. 682,207
[22] Filed Nov. 13, 1967
[45] Patented Apr. 6, 1971

[54] GUIDE AND COMPRESSION RING FOR GASKET INSERTS
24 Claims, 10 Drawing Figs.
[52] U.S. Cl. .................................................. 277/203, 289/363
[51] Int. Cl. ...................................................... F16j 9/04
[50] Field of Search .......................................... 277/203, 204, 192—199, 206; 285/363—368

[56] References Cited
UNITED STATES PATENTS
| | | | |
|---|---|---|---|
| 2,466,263 | 4/1949 | Nardin | 277/204 |
| 3,082,022 | 3/1963 | Moore | 285/368X |
| 3,302,953 | 2/1962 | Glasgow | 285/363X |

FOREIGN PATENTS
| | | | |
|---|---|---|---|
| 781,144 | 8/1957 | Great Britain | 285/368 |

Primary Examiner—William F. O'Dea
Assistant Examiner—Robert I. Smith
Attorney—Paul & Paul ABSTRACT: A gasket assembly is provided, in which two annular rings are secured together with a replaceable gasket engaged therebetween, the gasket being of annular configuration and having an annular protruding peripheral portion at its radial outermost edge of V-shape configuration, radial innermost edges of the rings being shaped together define a V-shaped configuration which, when the rings are clamped together, receive the annular V-shaped protrusion of the gasket therebetween, in clamped relation. Each ring is provided with axially bent tabs which are engageable with corresponding tabs of an adjacent ring, the tabs of each pair of rings being complementally configured and being adapted for locking engagement upon pressing the rings together and providing relative rotation between the rings, preferably in a counterclockwise direction. The tabs may take on various forms and may be provided with interlocking means. An asbestos insert or the like may be provided between the two rings to provide compression of the ring assembly.

INVENTOR.
Henry A. Pearson
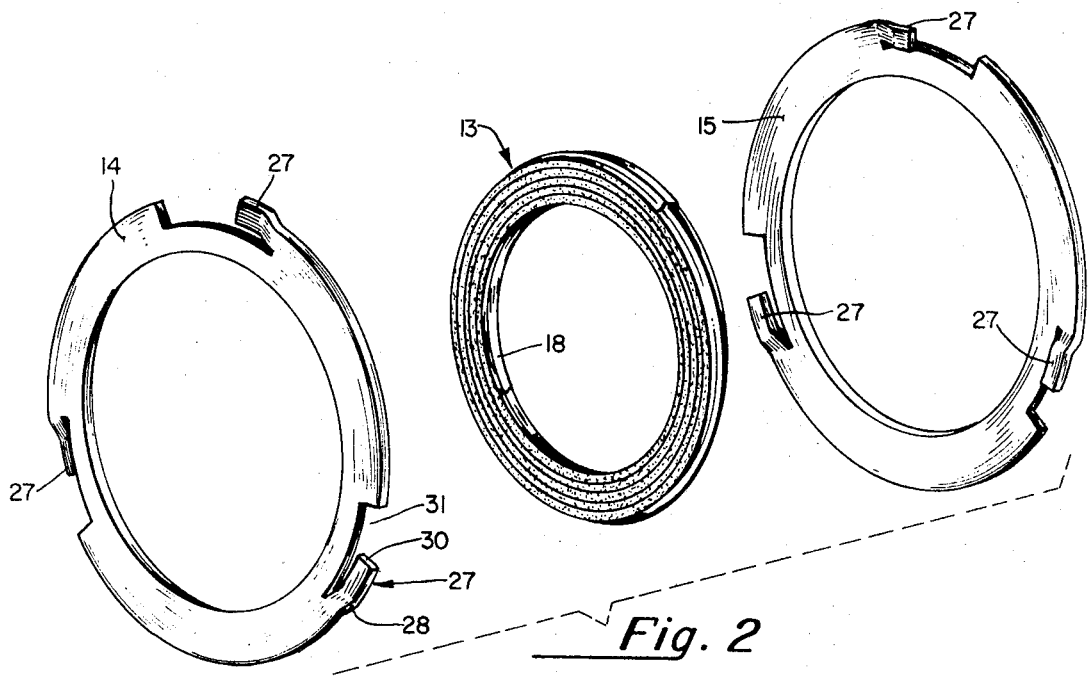
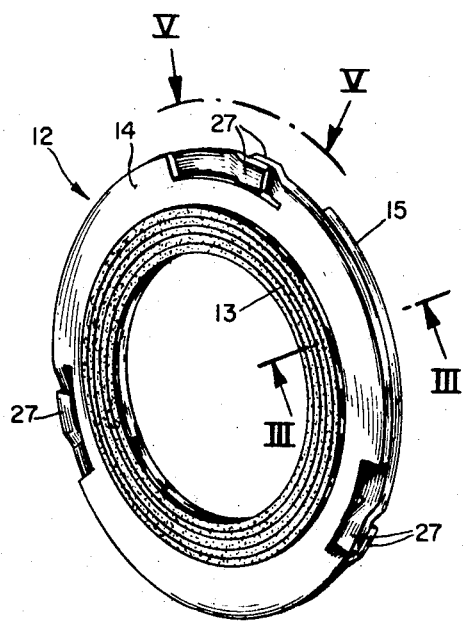
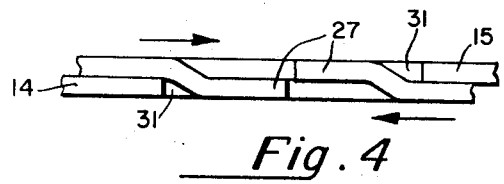
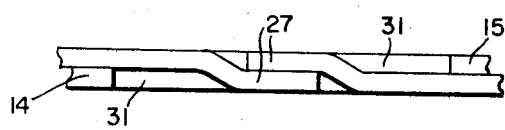
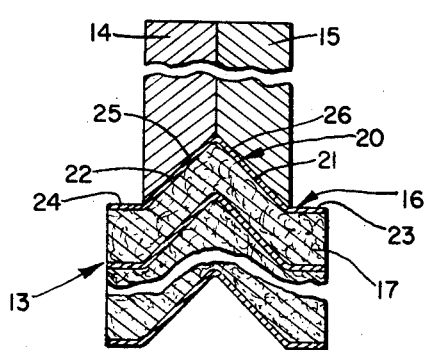

PATENTED APR 6 1971

INVENTOR.
Henry A. Pearson

BY

Paul + Paul
ATTORNEYS.

3,573,873

GUIDE AND COMPRESSION RING FOR GASKET INSERTS

BACKGROUND OF THE INVENTION

Prior-art devices generally utilize a solid ring construction with an annular groove cut on its radial innermost surface, for receiving the annular protrusion of a gasket member inserted therein, rather than the two-piece ring construction disclosed herein. Such prior-art constructions were often disadvantageous in that the gaskets were assembled into the rings only with substantial difficulty, often requiring the utilization of special equipment to effect the assembly. Also, because of possible damage to innermost portions of prior-art rings, it was necessary to tack-weld the rings to outermost metal portions of the gaskets, to insure the retention of the gaskets within the ring annular grooves.

SUMMARY OF THE INVENTION

The present invention seeks to obviate the above and other undesirable features of prior-art gasket assemblies in providing a two-piece ring assembly which is capable of clamping a spiral wound or other type of gasket therebetween, in a composite annular groove formed by cooperating edge portions of each of the rings, the rings being provided with devices for locking the rings together, in secured fashion.

Accordingly, it is a primary object of this invention to provide a novel gasket ring assembly utilizing two annular rings, each having means on an edge portion thereof for engaging a gasket and facilitating the clamping of the gasket between ring portions, including means for connecting the rings together.

It is another object of this invention to provide a gasket assembly having two annular rings with a gasket secured therebetween, in clamped relation, with locking means carried by the rings for facilitating the securing of the rings together.

It is a further object of this invention to accomplish the above object, wherein the locking means comprise integral tabs carried by each ring which are engageable with corresponding tabs carried by a cooperating ring.

Other objects and advantages of this invention will be apparent to those skilled in the art from the following detailed description, drawings and appended claims.

BRIEF DESCRIPTION OF THE DRAWINGS

FIG. 1 is a perspective view of the gasket assembly of this invention, wherein there is illustrated a gasket in confined relation between a pair of rings, the rings being disposed with their tabs in locked relation.

FIG. 2 is an exploded view of the rings and gasket of FIG. 1, wherein the details of construction of the ring tabs are clearly illustrated.

FIG. 3 is an enlarged fragmentary sectional view through the rings and gasket of this invention, taken generally along the line III—III of FIG. 1.

FIG. 4 is an enlarged fragmentary edge view of a pair of rings of this invention, with a tab of each ring disposed within a recess of the other ring, prior to relatively rotating the rings for locking engagement of the tabs.

FIG. 5 is a view similar to that of FIG. 4, but wherein the rings have been rotated relative to one another an amount sufficient to effect mutual engagement of the ring tabs.

DESCRIPTION OF THE DRAWINGS IN DETAIL

Figure 6:
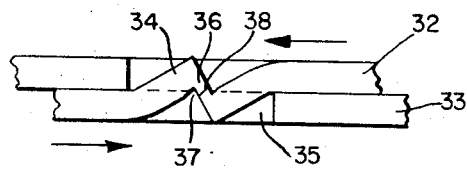
FIG. 6 is an enlarged fragmentary edge view of a pair of rings of this invention, of alternative construction to those illustrated in FIG. 4, wherein means are illustrated for facilitating interlocking engagement of the ring tabs upon relative rotation of the rings.

Referring now to the drawings in detail, reference is first made to FIG. 1 wherein there is illustrated a gasket assembly, generally designated by the numeral 12, comprising a spirally wound gasket 13 and clamping rings 14 and 15.

The spirally wound gasket 13 comprises a composite spiral of wire 16 and a radially compressible material such as asbestos 17, the spiral winding commencing at the inner diameter 18 of the gasket 13 and forming layers, as indicated in sectional view in FIG. 3, terminating in an outer peripheral winding 20.

The wire 16 is of generally V-shaped cross section (illustrated in FIG. 3 as having inverted V-shaped cross section) comprising tapered wall portions 21 and 22, terminating in axially directed portions 23 and 24, respectively.

Each of the rings 14 and 15 is of identical, generally annular configuration, being provided at their respective radial innermost edges 25 and 26 with a tapered configuration, which when the rings 14 and 15 are fitted together as illustrated in FIG. 3 to define together a generally V-shaped configuration, are adapted for engaging the respective surfaces 22 and 21 of the gasket 13.

Each of the rings 14 and 15 is provided with a plurality of equidistantly circumferentially spaced tabs 27, each tab comprising an angularly disposed bent portion 28 and a tab end portion 30. The tabs 27 are formed in a stamping operation or the like, and are axially offset, as viewed in FIGS. 4 and 5, all tabs 27 on a given ring extending in the same circumferential direction. During the formation of the tabs 27, a portion of the material of each of the rings 14 and 15 immediately adjacent an end portion 30 of each tab 27 is removed, to define recesses 31.

Each of the rings 14 and 15 is of identical construction, such that when the rings 14 aNd 15 are disposed on opposite sides of a gasket 13, with their tabs 27 aligned, opposing tabs 27 on the two rings 14 and 15 are offset into the recesses 31 formed in a mating ring.

With particular reference to FIGS. 4 and 5, it is seen that, upon relative rotation of the rings 14 and 15 in counterclockwise directions, the tabs 27, due to their offset disposition, will engage one behind the other to place the rings 14 and 15 into locked engagement.

The gasket assembly 12 of this invention is particularly adapted for disposition between pipe flanges, and it will therefore be noted that the locking means utilizing the tabs 27 of this invention is disposed generally entirely within the thickness of the two ring members 14 and 15, leaving protrusion-free opposite ring surfaces which may be constructed to be of sufficient thickness to comprise stops or compression limiting means between pipe flanges, thereby limiting the amount of compression to which the gasket 13 will be subjected, during tightening of pipe flanges axially thereagainst. The ring members 14 and 15 may also be of selected outer diameter to facilitate the coaxial centering of the assembly 12 between pipe flanges. Furthermore, it may be desirable to construct the rings 14 and 15, as well as the spiral wire 16 of stainless steel, in order to provide a desired resistance to corrosion. Furthermore, by constructing the rings 14 and 15 of steel, as in a stamping operation, the rings readily lend themselves to formation of the tapered surfaces 25 and 26, as in a coining operation, or the like.

Figure 7:
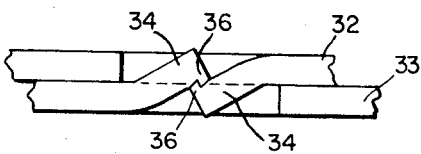
FIG. 7 is a view generally similar to that of FIG. 6, but wherein the rings are illustrated after relative rotation of the rings, with the ring tabs in interlocked relation with one another.

With reference to FIGS. 6 and 7, an alternative locking structure for the rings of this invention is illustrated, in the form of an interlocking means. A pair of rings 32 and 33 are provided, each having generally similar locking tabs 34 which may be formed concurrently with the formation of recesses 35. Each of the tabs 34 includes a tooth 36, behind which is formed a recess 37, each tooth 36 terminating in a cam surface 38.

Upon relative counterclockwise rotation of the rings 32 and 33, the teeth 36 of the tabs 34 engage each other along their cam surfaces 38 and are further outwardly bent against the inherent resilience of the tabs 34, to engage in interlocked relation, with a tooth 38 of each ring disposed within a recess 37 of the tooth of the other ring, as viewed in FIG. 7.

Figure 8:
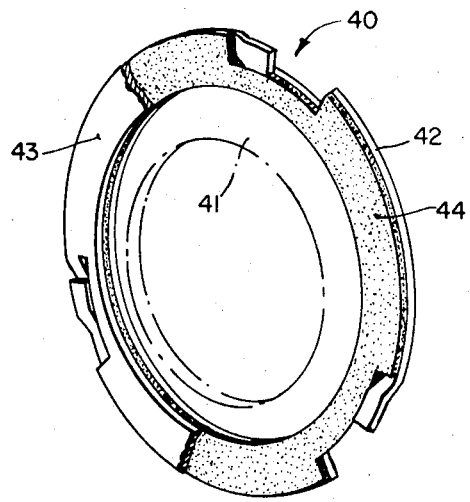
FIG. 8 is a perspective view of a gasket assembly of this invention, with the gasket being illustrated in phantom and with one of the rings being illustrated broken away for the sake of clarity, and wherein the rings are provided with a compression insert therebetween.

An alternative embodiment of this invention is illustrated in FIG. 8, wherein there is provided a gasket assembly generally designated by the numeral 40, comprising a gasket 41, illustrated in phantom and generally similar to the gasket 13 of FIG. 1, opposing rings 42 and 43, and a compression insert 44 of asbestos material or the like. The compression insert 44 is disposed between the two rings 42 and 43 and is adapted to provide an additional amount of compression for tightening pipe flanges (not illustrated) or the like, if desired. The rings 42 and 43 are generally similar to, but of lesser thickness than the rings 14 and 15, and therefore need not be further described herein. However, without the insert 44, the rings 42 and 43 may present a combined thickness which allows a high degree of compressive force of pipe flanges against the gasket 41, the relative thinness of the rings 42 and 43 precluding their use as stops.

Figure 9:
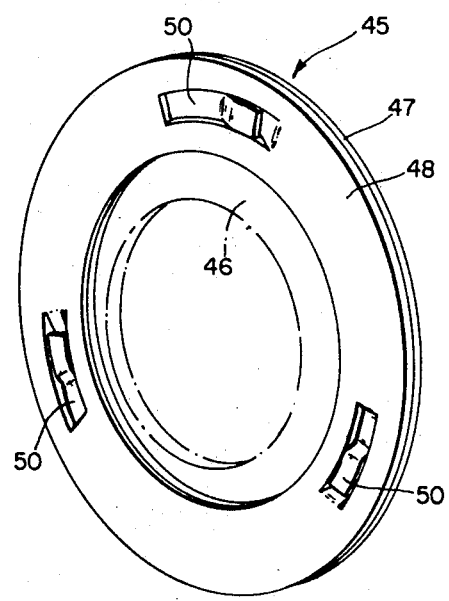
FIG. 9 is a perspective view of a gasket assembly of this invention, with the gasket being illustrated in phantom for the sake of clarity, and wherein an alternative placement of the locking tabs radially inwardly of an outer edge of the ring is illustrated as an alternative embodiment.

In FIG. 9 there is illustrated a further alternative embodiment of a gasket assembly 45 of this invention, comprising a gasket 46 (illustrated in phantom) and opposing rings 47 and 48. Each of the rings 47 and 48 is provided with three equidistantly circumferentially spaced tabs 50 which are engageable with corresponding tabs on the opposing ring, in a manner generally similar to that illustrated in FIGS. 4 and 5. The tabs 50 of the rings 47 and 48 are disposed radially inwardly of the outermost circumferential edge of each of the rings 47 and 48, as an alternative disposition for the locking feature of this invention.

Figure 10:
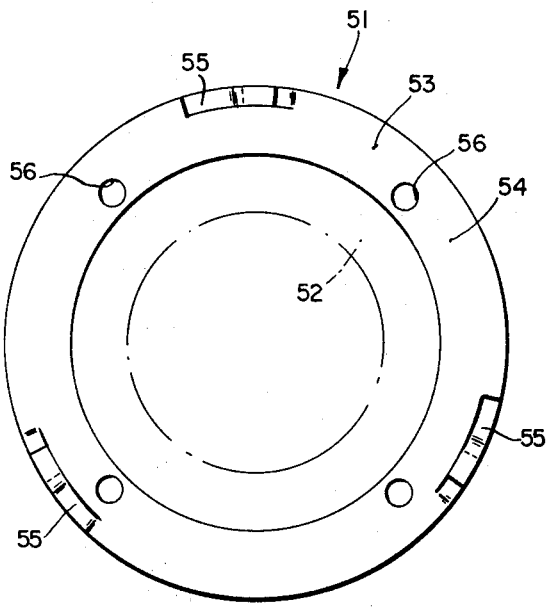
FIG. 10 is a front view of a gasket assembly of this invention, with the gasket being illustrated in phantom for the sake of clarity, the assembly being generally similar to that illustrated in FIG. 1, but wherein clearance holes are illustrated for receiving clamping members therethrough.

In FIG. 10 there is illustrated another modified form of gasket assembly 51 of this invention, including a gasket 52 (illustrated in phantom), and a pair of rings 53 and 54, the entire assembly being generally similar to that disclosed in FIG. 1, also including a similar arrangement of locking tabs 55. Each of the rings 53 and 54 is provided with a plurality of clearance holes 56, the corresponding clearance holes 56 on each of the opposing rings 53 and 54 being aligned when the rings are rotated in their counterclockwise direction, to positions of full locking engagement, as illustrated in FIG. 10. The clearance holes 56 are adapted to facilitate the connection of pipe flanges (not shown) through the rings 53 and 54 of the gasket assembly 51, in those instances where it is desirable to clamp the pipe flanges directly through the gasket assembly 51.

It is apparent that the invention in this case provides a gasket assembly, in which the gaskets are readily replaceable, and in which assembly of gaskets into their retaining rings is greatly facilitated.

I claim:

1. A gasket assembly comprising generally annular gasket means of predetermined axial thickness; said gasket means including a radially extending protrusion, first and second rings disposed axially relative to each other and of combined axial thickness less than said gasket means and having means thereon for clamping engagement with portions of said protrusion, and means carried by said rings for securing said rings together, wherein said securing means has an outer dimension as measured axially that is less than the axial thickness of the gasket means.

2. The gasket assembly of claim 1, wherein said protrusion is of V-shaped cross section, and edges of said rings cooperate to define a complemental V-shaped cross section.

3. The gasket assembly of claim 2, wherein the rings are of metal construction; that edge of each ring which forms part of the V-shaped cross section being coined therein.

4. The gasket assembly of claim 1, wherein said protrusion is annular and extends radially outward of said gasket means.

5. The gasket assembly of claim 1, wherein said gasket is of the spiral wound type.

6. The gasket assembly of claim 1, wherein said securing means are integral with said rings.

7. The gasket assembly of claim 1, wherein means are provided for facilitating axial compression of said assembled rings, said means comprising compressible insert means between major portions of said rings.

8. The gasket assembly of claim 1, wherein said gasket is removable and replaceable.

9. The gasket assembly of claim 1, wherein bolt clearance holes are provided through the rings, providing means facilitating mounting of the rings.

10. A gasket assembly comprising generally annular gasket means of a predetermined axial thickness; said gasket means including a radially extending protrusion, first and second rings of combined axial thickness less than said gasket means and having means thereon for clamping engagement with portions of said protrusion, and means carried by said rings for securing said rings together, wherein said securing means comprise spirally bent tabs of at least one of said rings extending into receiving means in the outer of said rings.

11. The gasket assembly of claim 10, wherein the rings are of metal construction, the tabs being stamped from the rings.

12. A gasket assembly comprising generally annular gasket means of predetermined axial thickness; said gasket means including a radially extending protrusion, first and second rings of combined axial thickness less than said gasket means and having means thereon for clamping engagement with portions of said protrusion, and means carried by said rings for securing said rings together, wherein said securing means comprise at least one tab of said first ring having an end portion extending into a recess in said second ring, and at least one tab of said second ring having an end portion extending into a recess in said first ring, the tab end portions being adapted to overlie each other in cooperative engagement.

13. The gasket assembly of claim 12, wherein tabs of said first and separate rings are complementally configured.

14. The gasket assembly of claim 12, wherein each tab end portion is disposed generally parallel to its connected ring.

15. The gasket assembly of claim 12, wherein each tab end portion is connected to its ring by an integral angularly bent portion.

16. The gasket assembly of claim 15, wherein each said angular bent portion provides resilient means for facilitating tab engagement.

17. The gasket assembly of claim 12, wherein each tab end portion is provided with interlocking means.

18. The gasket assembly of claim 17, wherein said interlocking means comprises cooperating complementary teeth and recesses; the tooth of each tab being engageable in a recess behind a corresponding tooth of a cooperating tab.

19. The gasket assembly of claim 18, wherein each tooth is provided with means facilitating camming of a cooperating tooth therepast.

20. The gasket assembly of claim 12, wherein a plurality of tabs of each of said first and second ring are provided, the tabs of each of said rings being equidistantly circumferentially spaced about said rings.

21. The gasket assembly of claim 12, wherein the tabs are disposed along the outer edge of the rings.

22. The gasket assembly of claim 12, wherein the tabs are disposed radially inwardly of an outer edge of the rings.

23. A gasket assembly comprising generally annular gasket means of a predetermined axial thickness; said gasket means including a radially extending protrusion, first and second rings of combined axial thickness less than said gasket means and having means thereon for clamping engagement with portions of said protrusion, and means carried by said rings for securing said rings together, wherein said securing means comprise means facilitating locking engagement of ring portions upon relative rotation of said rings.

24. A ring assembly for use in retaining a gasket between flanges, including first and second generally annular rings, each of said rings having means on edge portions thereof for engaging a gasket and facilitating the clamping of a gasket by the rings; each of said rings having tab means integral therewith for engaging corresponding tab means on the other said ring and locking the rings together against axial movement relative to each other.